Patented Mar. 10, 1953

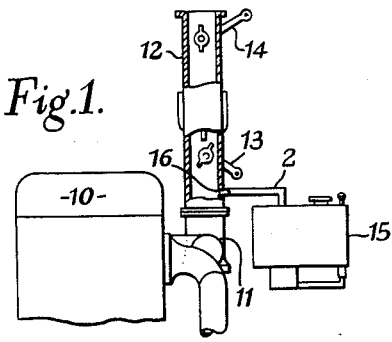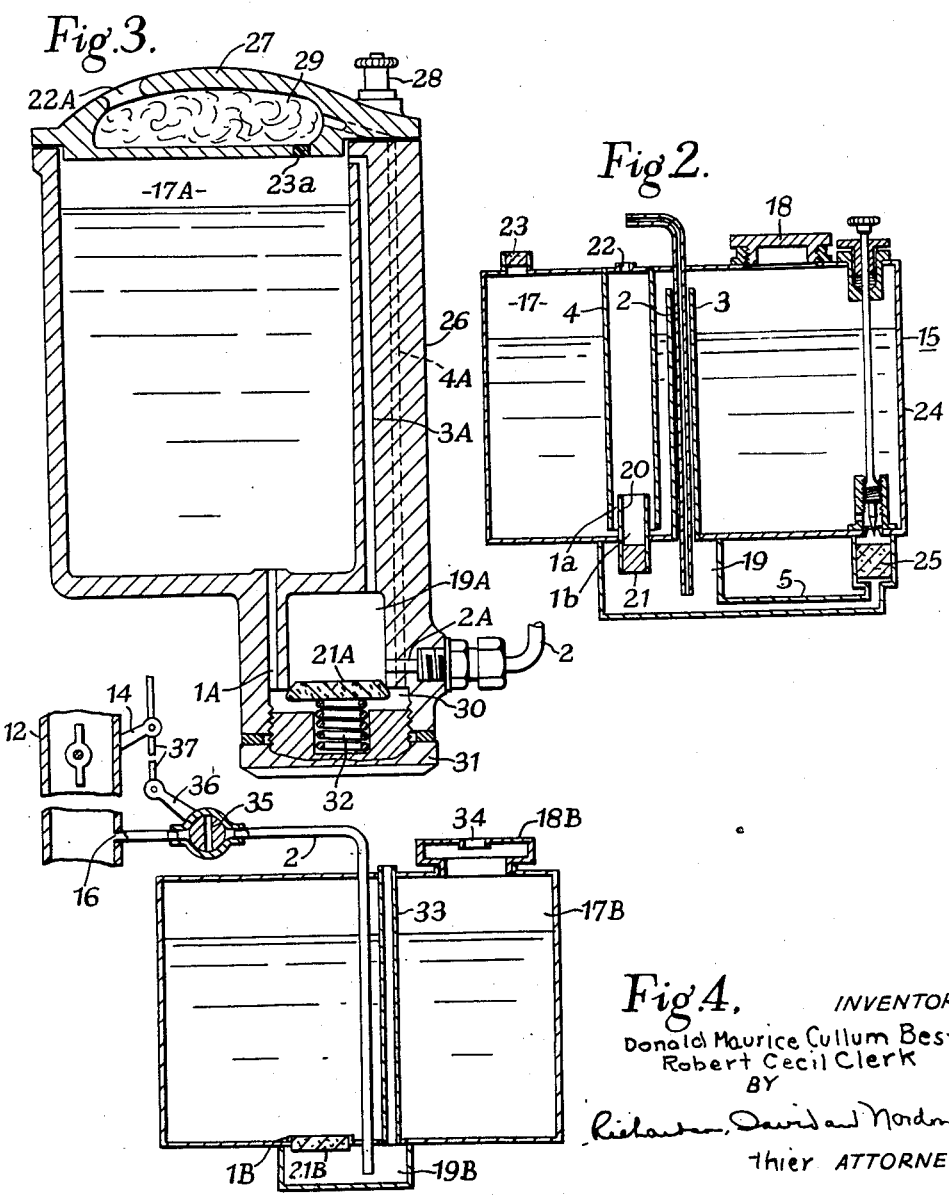

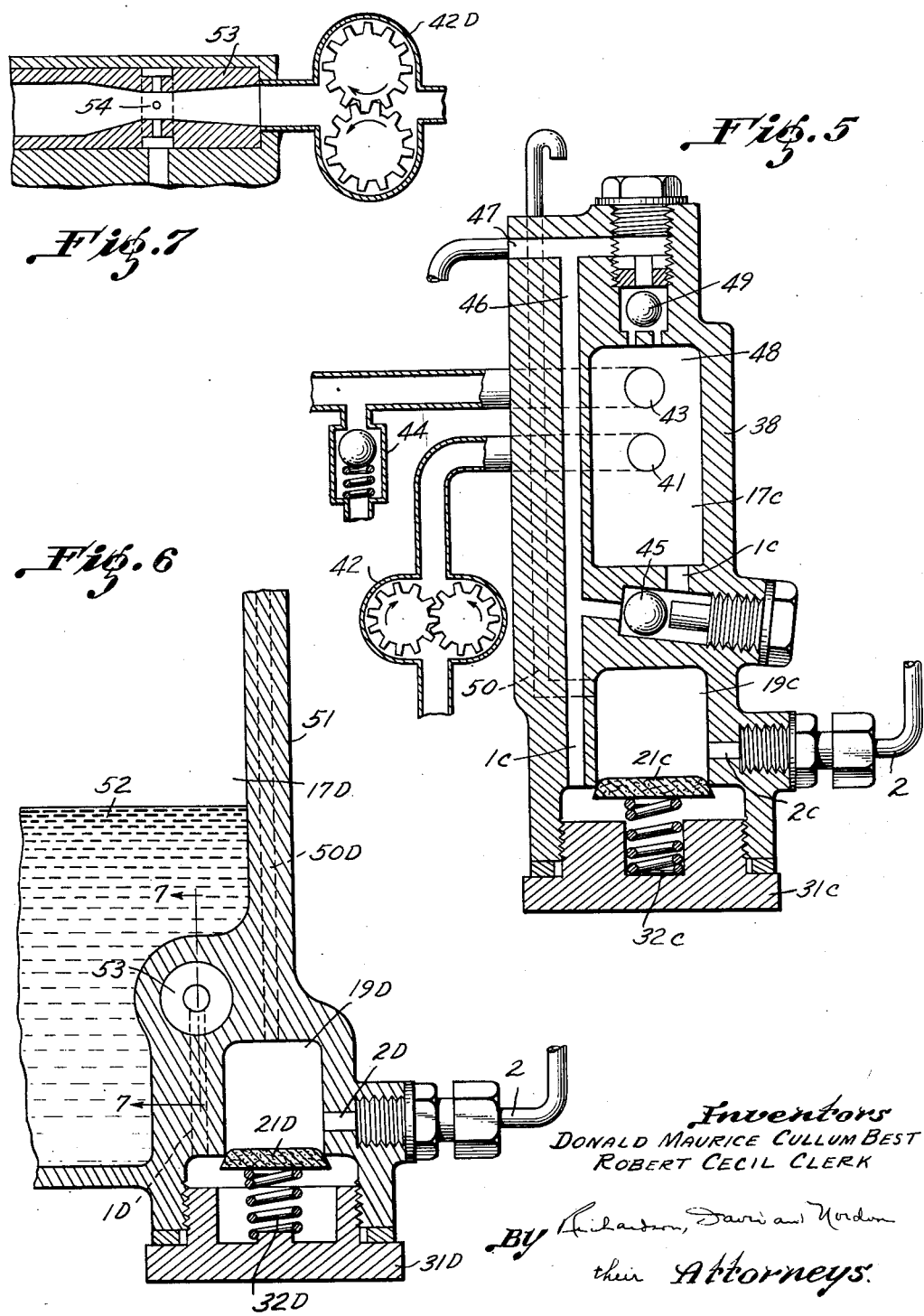

2,630,793

UNITED STATES PATENT OFFICE 2,630,793

UPPER-CYLINDER LUBRICATOR FOR INTERNAL-COMBUSTION ENGINES

Donald Maurice Cullum Best, Lordswood, and Robert Cecil Clerk, Richmond, England Application February 4, 1948, Serial No. 6,278
In Great Britain November 23, 1946

Section 1, Public Law 690, August 8, 1946
Patent expires November 23, 1966

3 Claims. (Cl. 123—196)

This invention relates to internal-combustion engines designed to run on a volatile liquid fuel which is supplied through a carburetter or other fuel-metering device to the induction system of the engine.

It is known that cylinder wear of engines having liquid fuel carburetters is aggravated by the conditions that occur in starting from cold and that such wear is reduced by providing upper cylinder lubrication, and furthermore that, after the engine has attained a normal temperature, upper cylinder lubrication is usually unnecessary and may even be disadvantageous.

An object of this invention is to provide a simple device which will operate automatically to feed upper cylinder lubricant to an internal-combustion engine when the engine is being started from cold and which, when the engine is running normally or is being started after only a short period of rest, will be inoperative or will feed a substantially reduced supply of upper cylinder lubricant.

Another object is to provide one form of such a device which will function without moving parts and which is therefore not liable to mechanical failure.

Another object is to provide another form of such a device which can be conveniently combined with the normal lubrication system of the engine.

Further objects and advantages of the invention will be apparent from the following description of examples thereof given with reference to the accompanying diagrammatic drawings, in which:

Fig. 1 shows part of an internal-combustion engine fitted with an oil dispensing device in accordance with the invention, Fig. 2 is a section of the dispensing device shown in Fig. 1, Fig. 3 is a section of a device similar in principle to that appearing in Fig. 2, but of different construction, Fig. 4 is a section of a modified arrangement, Fig. 5 is a section of another form of dispensing device associated with parts of an internal-combustion engine, Fig. 6 is a section of part of the oil sump of an internal-combustion engine having yet another form of dispensing device, Fig. 7 is a section on the line 7—7 in Fig. 6.

In all the examples hereinafter described the dispensing device includes a reservoir chamber for the oil, a metering chamber adapted to be charged with oil by gravity through a first duct which communicates between these chambers and which includes flow-restricting means of such capacity that it takes an appreciable time, e. g. at least about ¼ hour for the metering chamber to be refilled, a second duct opening out of the lower part of the metering chamber and adapted to be connected to the induction system, and an air vent opening into the upper part of the metering chamber and opening to the atmosphere at a level not lower than the intended highest surface level of oil in the reservoir chamber.

In the examples shown in Figs. 1 to 3, the air vent includes a third duct communicating between said chambers and opening into the upper part of each chamber, and a fourth duct joining said first duct at a point between the flow-restricting means and the reservoir chamber and leading to a port open to the atmosphere.

In Fig. 1 an internal-combustion engine 10 has an induction manifold 11 fed by a carburetter 12 having a throttle control lever 13 and a starting choke control lever 14. The dispensing device 15 has an oil delivery pipe 2 rising to a port 16 in the induction system between the throttle and the manifold.

As shown in Fig. 2, the dispensing device 15 includes a reservoir chamber 17 intended to be charged with upper cylinder lubricant through a filling orifice closed by an air-tight plug 18. A metering chamber 19 is arranged below the reservoir chamber and a tube 20 passing through the floor of the reservoir chamber projects into both chambers and contains a porous flow-restricting plug 21. A tube 4 is sealed at its upper end to the top of the reservoir chamber and its lower part surrounds the upper end of the tube 20. There is a gap between the bottom of the tube 4 and the floor of the reservoir chamber. An air port 22 puts the upper end of the tube 4 into direct communication with the atmosphere. A tube 3 opening out of the top of the metering chamber passes upwards through the reservoir chamber, there being a narrow gap between its top end and the top of the reservoir chamber. The pipe 2 passes through the top of the reservoir chamber, in which it is sealed, and through the tube 3 into the metering chamber, terminating near the bottom of the metering chamber. An air vent, plugged with a porous body 23 offering an appreciable resistance to any substantial flow of air through it, communicates between the upper part of the reservoir chamber and the atmosphere.

The aforesaid first duct is constituted by the annular duct 1a between the tubes 4 and 20 and the interior 1b of the tube 20. The aforesaid fourth duct is the interior of the tube 4 between the port 22 and the junction of the ducts 1a and 1b.

In operation, while the engine is at rest, the ducts 1a and 1b and the tube 4 are filled with lubricant up to the level of the surface of the lubricant in the reservoir chamber 17; lubricant from the reservoir also passes through the duct 1a and 1b including the restrictor 21 and slowly fills the metering chamber 19, the pipe 2 and the tube 3 up to the said level.

When the engine is started, the resulting depression in the induction system is applied by the port 16 (Fig. 1) to the pipe 2 and lubricant is thereby sucked out of the metering chamber 19, being replaced by air passing through the tube 3 from the upper part of the reservoir chamber 17. When the charge of lubricant has been thus extracted from the metering chamber 19, since the reservoir is substantially sealed, a relatively small flow of air is established from the atmosphere to the induction system through the port 22, the tube 4, and thence in succession through the duct 1a, the reservoir chamber 17, the tube 3 and the metering chamber 19, any substantial direct flow of air from the tube 4 to the metering chamber being prevented by the restrictor 21. This downward flow of air along the duct 1a is maintained in a direction opposite to that in which lubricant flows along this duct from the reservoir chamber 17 to the metering chamber 19 when the engine is at rest, and so prevents access of lubricant to the induction system once the charge in the metering chamber has been delivered.

The flow capacities of the ducts are such that the quantity of air bled into the induction system is not sufficient to prevent the engine from idling normally.

If it is desired to maintain a limited supply of upper cylinder lubricant all the time the engine is running, e. g. in order to assist the running-in of a new or rebored engine, a pipe 5 may be provided incorporating a restrictor 25 and connecting the reservoir chamber 17 directly to the metering chamber 19. A needle valve 24 may be provided for closing the pipe 5.

The air vent plug 23 has a very small flow capacity and serves only to maintain atmospheric pressure in the air space of the reservoir chamber when the engine is stopped. If this vent were not provided, a rise in ambient temperature might cause lubricant to be discharged to the manifold in consequence of expansion of the contents of the reservoir chamber.

The example shown in Fig. 3 operates in the same way as that shown in Fig. 1, the reservoir chamber 17A and the metering chamber 19A being contained in a cast body 26. A cast cover 27, retained by nuts such as 28, is hollow and contains air filtering packing 29. The air inlet duct 4A communicates with the atmosphere through the filter 29 and a port 22A. The air vent plug 23A communicates between the reservoir chamber 17A and the filter 29. The aforesaid first duct is a bore 1A leading from the reservoir chamber 17A to a chamber 30 below the metering chamber 19A and closed by a screw plug 31. A duct 3A connects the reservoir and metering chambers. The restrictor is a shallow plug 21A of porous material held against a seating at the bottom of the metering chamber by a spring 32. A port 2A leads from the bottom of the metering chamber to the oil outlet pipe 2 that leads to the induction system.

In another embodiment of the invention means responsive to the operation of a starting control member for the engine serve for at least reducing the rate of flow of oil at a point in the duct between the reservoir and the induction system shortly after the engine has started. This point may be between either the reservoir chamber and the metering chamber or the metering chamber and the induction system. Such an arrangement is shown in Fig. 4. A short tube 1B communicates between the reservoir chamber 17B and the metering chamber 19B and contains a porous restrictor plug 21B. A pipe 33 vents the metering chamber, opening to atmosphere above the top of the reservoir chamber. The filler cap 18B has an air vent 34. The oil outlet pipe 2 includes a stop cock 35 operated by a lever 36 coupled by a link 37 to the choke control lever 14 of the carburetter 12. Before the engine is started from cold, the choke control is set to open the cock 35, and when the engine starts it sucks a charge of lubricant out of the metering chamber. When the choke control is restored to its normal position, the cock 35 shuts and isolates the dispensing device from the engine. Thereafter the metering chamber is refilled slowly by lubricant percolating through the restrictor 21B.

The device shown in Fig. 5 is adapted to supply oil from the engine lubrication system to the induction system, and it comprises a reservoir chamber which communicates with the pressure side of a lubricating pump of the engine; the duct between the reservoir's metering chambers includes a valve which is open when the engine is stationary and which is adapted to close in response to rise in pressure in the reservoir due to operation of said pump, and the reservoir is provided with a vacuum-relief port controlled by a non-return valve. The device has a cast body 38 suitably for attachment by bolts to a facing on the crank case of the engine.

The bottom of the metering chamber 19C is formed by a porous restrictor plug 21C held in place by a spring 32C retained by a screw cap 31C. A port 2C opening out of the lowering part of the metering chamber 19C communicates with the pipe 2 that leads to the engine induction system. The reservoir chamber 17C is disposed above the metering chamber and is provided near its upper end with an oil-inlet port 41 communicating with the pressure side of the oil circulating pump 42 of the engine and with an oil-outlet port 43 leading to the oil distributing ducts and the ordinary pressure-relief valve 44 of the engine lubrication system.

A duct 1C leading from the bottom of the reservoir chamber 17C to the under side of the restrictor 21C contains a ball valve 45 so arranged that it opens under the influence of gravity when the reservoir chamber is at atmospheric pressure and closes automatically when the reservoir pressure is raised by the pump 42. The ball may be of oil-resistant synthetic rubber. A branch 46 opens out of the second duct between the automatic valve 45 and the restrictor 21C and rises to a small relief port 47 opening to the engine sump at a level substantially higher than the bottom of the reservoir chamber 17C. In the top of the reservoir chamber are air inlet ports 48 controlled by a non-return valve 49 and communicating with the restricted relief port 47. A restricted air vent duct 50 leads out of the top of the metering chamber 19C and opens to atmosphere at a level above the top of the reservoir.

While the engine is running, the reservoir 17C is full of oil under the delivery pressure of the pump 42, the automatic ball valves 45 and 49 are closed, the metering chamber 19C is empty of oil, and a small flow of air, insufficient to affect the operation of the engine, passes through the restricted air vent 50 and the metering chamber to the induction system. If the valve 45 accidentally fails to close, pressure in the part of the duct IC beyond this valve is relieved by the branch 46.

When the engine stops, the pressure in the reservoir chamber 17C rapidly falls to atmospheric, the non-return valve 49 and the automatic ball valve 45 open, and oil passes slowly through the valve 45 and the restrictor 21C into the metering chamber 19C, displacing the air in the latter through the air vent duct 50. If after the metering chamber has filled the engine is started, the induction vacuum sucks a dose of oil out of the metering chamber and the rise in pressure in the engine lubrication system causes the valves 45 and 49 to close and the reservoir chamber 17C to be recharged.

In another combination according to the invention, the duct by which the metering chamber communicates with the reservoir chamber includes a duct leading to the suction port of an ejector in an oil line which forms part of the engine lubrication system and in which oil flows at a pressure not substantially exceeding atmospheric pressure when the engine is running. The said oil line may be, for example, the suction duct of the engine lubrication pump or the outlet duct of a by-pass filter. Such a device is shown in Figs. 6 and 7 incorporated in the engine; the engine sump, a wall of which is denoted by 51, forms the reservoir chamber 17D in which oil stands normally at a surface level 52. The oil pump 42D of the engine is fed from the sump chamber 17D through an inlet duct which contains an ejector 53. A duct ID connects the throat 54 of the ejector to the under side of a restrictor 21D closing the bottom of the metering chamber 19D and held in plane by a spring 32D retained by a screw cap 31D. A restricted duct 50D leads from the top of the metering chamber 19D and opens to atmosphere at a point above the level 52. A port 2D opens from the bottom of the metering chamber and leads to the oil delivery pipe 2.

While the engine is running, the flow of oil in the pump inlet line acts on the ejector 53 in such a manner as to prevent the diversion of oil through the duct ID to the metering chamber. When the engine stops, oil flows slowly from the sump 17D to the throat of the ejector and through the duct ID and the restrictor 21D to the metering chamber 19D. When the engine is started, the induction vacuum empties the metering chamber.

In all the examples hereinbefore described, the oil restrictor is preferably so designed, in relation to the viscosity of the oil at the time the restrictor is required to operate, that the time required for the metering chamber to become completely refilled is of the same order as the time required for the engine to become cool after stopping. Ordinarily a period of between 1 and 3 hours is suitable for an automobile engine. In cases where an automobile is used for successive short runs in very cold weather, the restrictor may be arranged to provide a considerably shorter refilling period, e. g. ½ hour. The refilling period must be such that attempts to start an engine repeated in close succession will not cause substantially more than one dose of oil to be admitted to the induction system. The size of the dose increases with the time the engine has been stopped and the consequent fall in temperature of the engine. The restrictor may be of felt, porous bronze, silicate, or other filter-like material.

We claim:

1. A device for dispensing lubricating oil to the induction system of an internal-combustion engine, said device having a reservoir chamber for oil provided with a substantially air-tight cap and a restricted air vent, a metering chamber, a first duct opening out of the lower part of said reservoir chamber and opening into said metering chamber, a porous flow-restricting plug in said duct, a second duct opening out of the lower part of said metering chamber for connection to the induction system, a third duct communicating between said chambers and opening into the upper part of each chamber, and a fourth duct joining said first duct at a point therein between said plug and said reservoir chamber and leading independently of said reservoir chamber to a port open to the atmosphere at a level not lower than the top of said reservoir chamber, the air flow capacity of said vent being substantially smaller than the capacity for air flow in series through said fourth duct, the part of said first duct between said reservoir chamber and the junction of said first and fourth ducts, said third duct and said second duct.

2. A device as claimed in claim 1, wherein said fourth duct includes an air filter.

3. A device for dispensing lubricating oil to the induction system of an internal-combustion engine and including a reservoir chamber for the oil, a metering chamber having a floor constituted by a porous plug, a first duct for conveying oil by gravity from said reservoir chamber to the under side of said plug, a second duct opening out of said metering chamber for connection to the induction system, a third duct communicating between said chambers and opening into the upper part of each chamber, and a fourth duct leading independently of said chambers from the under side of said plug to a port opening to atmosphere at a level not below the top of said reservoir chamber, said reservoir chamber being substantially sealed with respect to atmosphere, apart from its connection to atmosphere via said first and fourth ducts.

DONALD MAURICE CULLUM BEST.
ROBERT CECIL CLERK.

REFERENCES CITED

The following references are of record in the file of this patent:

UNITED STATES PATENTS

| Number | Name | Date |
| --- | --- | --- |
| 1,687,780 | Neale | Oct. 16, 1928 |
| 1,810,193 | Thomas | June 16, 1931 |
| 1,934,734 | Neely | Nov. 14, 1933 |
| 2,072,855 | Danver | Mar. 9, 1937 |
| 2,223,881 | Armitage | Dec. 3, 1940 |
| 2,267,728 | Green | Dec. 30, 1941 |

FOREIGN PATENTS

| Number | Country | Date |
| --- | --- | --- |
| 13,243 | Austria | May 11, 1928 |
| 81,604 | Sweden | Oct. 2, 1934 |